US012786595B2

(12) United States Patent
Tan et al.

(10) Patent No.: US 12,786,595 B2
(45) Date of Patent: Nov. 3, 2026

(54) SYMMETRIC IMAGE DATA CAPTURE FROM AN ASYMMETRIC IMAGE DETECTOR

(71) Applicant: VAREX IMAGING CORPORATION, Salt Lake City, UT (US)

(72) Inventors: Harry Tan, Pleasanton, CA (US); Michael Ridgeway, Menlo Park, CA (US); Mihir Shah, San Jose, CA (US); Elisha Erlien, Mountain View, CA (US); Carlo Tognina, Salt Lake City, UT (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 233 days.

(21) Appl. No.: 18/917,753

(22) Filed: Oct. 16, 2024

(65) Prior Publication Data

US 2025/0168534 A1 May 22, 2025

Related U.S. Application Data

(60) Provisional application No. 63/601,694, filed on Nov. 21, 2023.

(51) Int. Cl.
*H04N 25/78* (2023.01)
*H04N 23/62* (2023.01)
(Continued)

(52) U.S. Cl.
CPC ............ *H04N 25/78* (2023.01); *H04N 23/62* (2023.01); *H04N 25/20* (2023.01); *H04N 25/30* (2023.01); *H04N 25/767* (2023.01)

(58) Field of Classification Search
CPC ........ H04N 25/78; H04N 23/62; H04N 25/20; H04N 25/30; H04N 25/767; H04N 25/443; H04N 25/779; H04N 25/41
See application file for complete search history.

(56) References Cited

U.S. PATENT DOCUMENTS 6,404,852 B1 * 6/2002 Petrick .................... A61B 6/00 378/98.8
11,386,863 B2 * 7/2022 Yang .................... G09G 3/3685
(Continued)

FOREIGN PATENT DOCUMENTS

EP 1248456 A2 10/2002

OTHER PUBLICATIONS

PCT/US2024/051631 International Search Report and Written Opinion dated Nov. 22, 2024. 9 pages.

*Primary Examiner* — Uzma Alam
*Assistant Examiner* — Gisselle M Gutierrez
(74) *Attorney, Agent, or Firm* — Dorsey & Whitney LLP

(57) ABSTRACT

Technology is described for a system for symmetric readout from an asymmetric split flat panel image detector. The system may include an odd number of gate drivers to supply image data signals from an image detector with asymmetrically split partitions. A gate controller may control the image data signals from the odd number of gate drivers. A virtual gate driver, associated with the gate controller, may provide dummy data that is supplemental symmetric row data to be combined with image data signals from the odd number of gate drivers of the image detector. A data capture module may capture symmetric image data including dummy data as received using the gate controller.

20 Claims, 7 Drawing Sheets

(51) Int. Cl.

| | |
|---|---|
| ***H04N 25/20*** | (2023.01) |
| ***H04N 25/30*** | (2023.01) |
| ***H04N 25/767*** | (2023.01) |

(56) References Cited

U.S. PATENT DOCUMENTS

| | | | | |
|---|---|---|---|---|
| 2003/0021455 | A1 | 1/2003 | Dixon et al. | |
| 2005/0219188 | A1* | 10/2005 | Kawabe | G09G 3/342 345/94 |
| 2019/0318147 | A1* | 10/2019 | Shen | H03K 5/15093 |
| 2020/0234669 | A1* | 7/2020 | Kuo | G09G 3/3677 |

* cited by examiner

SYMMETRIC IMAGE DATA CAPTURE FROM AN ASYMMETRIC IMAGE DETECTOR

CROSS-REFERENCE TO RELATED APPLICATION(S)

This application claims priority to U.S. Provisional App. No. 63/601,694, filed 21 Nov. 2023, entitled "SYMMETRIC IMAGE DATA CAPTURE FROM AN ASYMMETRIC IMAGE DETECTOR", the entire disclosure of which is hereby incorporated by reference in its entirety.

BACKGROUND

X-ray detectors may define an array of pixels disposed on a substrate. Hundreds to thousands of data lines may be coupled to the array of pixels to enable the transfer of signals from the pixels. An interconnect including readout electronics may be bonded to the substrate with an anisotropic conductive film (ACF). The interconnect with the readout electronics may be electrically connected to a printed circuit assembly (PCA) with other circuits of the X-ray detector.

DETAILED DESCRIPTION

Figure 1:
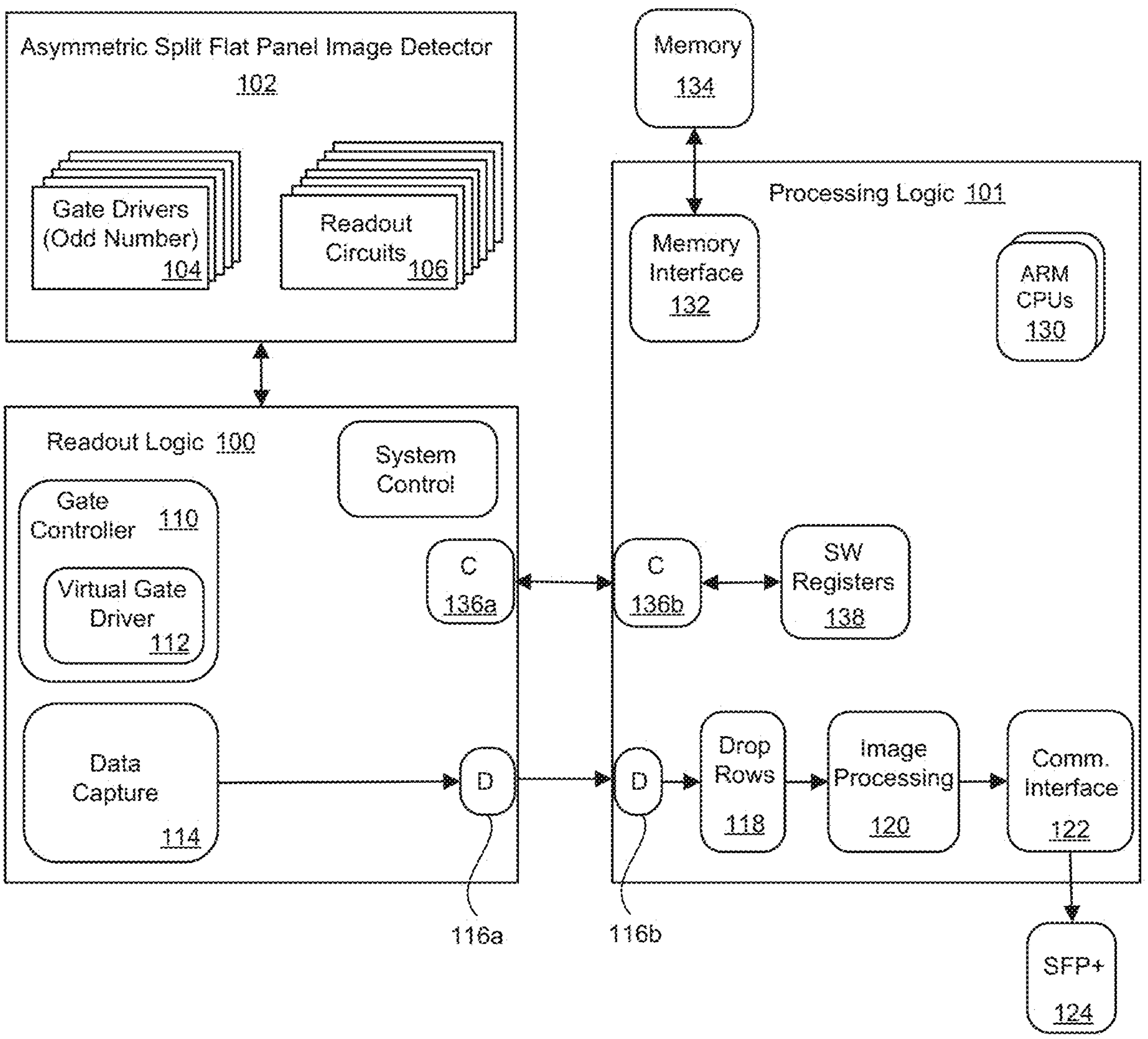
FIG. 1 is a block diagram illustrating an example of a system for providing symmetric image sensor readout from an asymmetric split detector.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

This technology relates to imaging devices (e.g., x-ray imaging) that use an asymmetric split flat panel detector. As will be described in further detail below, an odd number of gate drivers may be used in an asymmetric split panel detector that has at least two partitions used for readout. Because it can be desirable to read from both partitions of the asymmetric split panel detector, a virtual gate driver may be provided to supply supplemental data (e.g., dummy data) and emulate a symmetric readout of the image data. A drop rows module may be included in order to drop any rows of the supplemental or dummy data and/or to drop rows that are not included in a region of interest (ROI) provided by a user.

Large size X-ray flat panel detectors are often split into two symmetric partitions with both partitions being read out in parallel to shorten the total readout time of the image data in frames and thus improve overall frame rates. A line may be read from each partition during the same time period. In order to read two lines out at a time, a gate driver is used in parallel for each partition.

Split partition X-ray detectors generally exhibit improved low dose performance due to shorter effective data line traces. Symmetrically split flat panel image detectors allow for a simple control of readout ICs (ROIC) and gate driver ICs to readout the image data (e.g., a pixel array) from the flat panel image detector. Furthermore, a symmetric split also simplifies the signal and data processing in circuits (e.g., field programmable gate arrays (FPGAs)) that may also reside with the flat panel image detector.

For certain sized X-ray flat panel image detectors, an odd number of gate drivers are used for both cost and design reasons, resulting in asymmetric split flat panel detectors such that an odd number of gate drivers are used to read out the top partition and an even number of gate drivers are used to read out the bottom partition, or vice versa. This arrangement has become more prevalent as the number of gate lines serviced by a gate driver has increased from 128 channels up to the present use of 512 channels (and 512 rows) per gate driver.

Asymmetric split flat panel detectors present challenges to the firmware controlling the gate drivers when only part of the image (e.g., a region of interest (ROI)) is requested by users, as is the case in so-called pan or zoom imaging modes. In such imaging modes, the middle (or center line) of an image from a user's point of view may be different from the physical partition split in the actual image detector. In one example, the image detector's middle row as it appears to a user may appear to be between row number 1279 and row number 1280 because this is the total number of image rows divided by two, which defines the center row of the image. However, the physical split in the gate drivers of the asymmetric flat detector may be between row number 1535 and row number 1536, due to the odd number of gate drivers used. For instance, the physical split may be between the $3^{rd}$ and $4^{th}$ gate drivers when there are 5 gate drivers (e.g. three gate drivers in the top partition and two gate drivers in the bottom partition). Therefore, to support pan or zoom modes in asymmetric split detectors, a seamless translation of a user specified region of interest (ROI) to an implementable ROI in the control circuits (e.g., FPGA ROI) may be desired. In addition, the ability to read out symmetric image data from the asymmetric flat panel detector by using dummy data from a virtual gate driver may allow a symmetric configuration of existing processing pipelines to be used applied to the image data.

FIG. 1 is a block diagram illustrating an example of a system for providing symmetric image detector readout from an asymmetric split flat panel image detector 102. Image data signals may be read using the odd number of gate drivers 104 through the readout circuits 106 from the asymmetric split partition flat panel detector 102 (also referred to as an "image detector"). FIGS. 4-7 provide additional background details about the image detector, which will not be discussed at this point in the description.

An odd number of gate drivers 104 may be used to supply image data signals from an image detector with asymmetrically split partitions. A physical symmetry line of the image detector may be defined by an odd number of gate drivers in a first partition and an even number of gate drivers and a virtual gate driver in a second partition. Since the total number of physical gate drivers 104 may be odd, when the odd number of gate drivers 104 is split into two or more partitions, at least one of the partitions may have an odd number of gate drivers 104. The partition with the even number of gate drivers may also include the virtual gate driver (which will be described in more detail later). The asymmetric split partition flat panel detector may be able to detect image modalities that are at least one of: X-rays, ultraviolet or infrared.

A gate controller 110 may be used to control the readouts from the asymmetric split partition flat panel detector 102, which includes the image data signals received from the odd number of gate drivers 104. The gate drivers 104 may be controlled by the gate controller 110 and may include the ability to control: which row is enabled, moving to the next row, the pattern of rows to be read, etc. The gate controller 110 may also allow designated rows to be skipped during readout. In some situations, the customer may want the whole image that was detected, then all the rows may be readout. In other situations, a customer may want only a portion of a detected image. For example, higher frame rates may be reached by reading a sub-section of the rows as defined by a region of interest (ROI).

A virtual gate driver 112 may be used to provide dummy data that is supplemental symmetric row data that may be combined with image data signals from the odd number of gate drivers 104 of the asymmetric image detector 102. The virtual gate driver 112 may be associated with (e.g., controlled by) the gate controller. For example, the virtual gate driver 112 may be in the gate controller 110 and outputs may be provided from the gate controller 110 with the dummy data. Alternatively, the virtual gate driver 112 may be implemented in logic of the FPGA that is outside the gate controller 110.

A data capture module 114 may receive image data signals from the gate drivers 104 and the analog outputs with dummy data from the gate controller 110 to obtain symmetric image data. The image data signals and the dummy data may be converted from analog to digital format or digitized using an analog-to-digital converter (ADC) and stored in a buffer of the data capture module 114. The digitized data may be image data representing an image of a patient or an object. Since the data capture module 114 is prepared to process and accept the image data in a symmetric format, the gate controller 110 is aware of the need for symmetric data to be used by the data capture module 114, and outputs in the dummy data for the data capture. For example, this allows the same processing code (e.g., written in the FPGA) to be executed on this asymmetric readout FPGA as may be executed on a symmetric readout FPGA.

The virtual gate driver 112 may provide a symmetric pairing of dummy data to the data capture module 114 to provide symmetry for a gate driver 104 that provides image data signals from one partition of the asymmetric image detector 102. For example, in an asymmetric image detector 102 with five (5) gate drivers 104, gate driver 104 number one may be paired with the virtual gate driver. So, when gate driver 104 number one is read out, the dummy data from the virtual gate driver may also be read out from the gate controller 110 to provide an overall symmetric readout for the image data signals.

Physical output connections may exist for the virtual gate driver 112 but the data sent out on those physical outputs is generated data. For example, when asymmetric data is being read out, gate driver number one may be read out simultaneously with the virtual gate driver 112 and the state read out from the virtual gate driver 112 can be a set of dummy values (e.g., fixed values). The gate controller outputs in the FPGA may be considered substituted data for the readout operations. The dummy data or these dummy values may be standardized information stored or created in the gate controller such as: a single repeated value, a group of repeated values, functionally generated data or randomly generated data. The image data and the dummy values may be buffered together in the data capture module 114.

In one configuration, an AFE (analog front end) control (not shown) may provide analog conditioning circuitry and the ASICS to receive the analog data in preparation for digitization. When a row is enabled, the AFE control may be used to read out all the columns. This AFE module may assist with capturing the raw data symmetrically and sequentially.

The digitized image data may be sent across a custom data bus 116*a*, 116*b* between the readout logic 100 and the processing logic 101 (e.g., the two FPGAs). Specifically, the custom data bus 116*a*, 116*b* may be a high speed data bus to transfer the image without errors.

In FIG. 1, the processing logic 101 is illustrated in the right hand side block. The processing logic may include ARM CPUs 130 to execute embedded software. The ARM CPUs may have access to a memory 134 through a memory interface 132.

The system may provide pre-defined sizes of image data for customers to use, but if the customer want to use a smaller image window then an ROI (region of interest) mode may be used and the ROI may be scaled up in the pipeline. The ROIs may be scaled without any changes to the back end processing.

ROI settings or ROI parameters may be loaded from memory 134 into software registers 138 and sent through a data bus or data channel C 136*a*, 136*b* to the readout logic 100. The ROI settings may be set before acquisition of the image data and may be set for each application. Examples of settings to be sent may include: the image parameters and image size, readout line time, how long the system may wait for each line, how long after each line is turned on does the system wait until readout, etc.

The information that is not going to be used, because the image data is outside of an ROI or the information is dummy data, may be dropped during image processing. A drop rows module 118 may be provided to drop rows from the image data received from the data capture module 114 in order to yield symmetric data from the asymmetrically split detector array. For example, the drop rows module 118 may drop virtual rows with dummy data to yield image data from the asymmetrically split flat panel detector array. The ARM CPUs 130 may also load settings that instruct the drop rows module 118 (e.g., implemented in the FPGA) about how many rows to drop or which rows to drop. The predetermined settings or parameters for the drop rows module 118 may be in a file and the processor may load that data from a file in memory 134 when the system starts up (e.g., at boot up).

The readout may still treat the image data as a symmetric image detector but there may be different modes such as: size modes, ROI modes or panning modes. However, dropping rows from the image data results in a smaller size image. The drop rows module 118 may drop dummy rows and rows that are not part of the ROT. The drop rows module is programmable and can be instructed to drop a specific row or ranges of rows. For a user or application to get the high speed they may desire, these reduced area images may be produced to get the increase the output speeds for video and similar output.

This data processing pipeline may form the full image before the image is sent out to the user and applications. The captured image data may have image processing 120 applied in the data pipeline. The image processing 120 may include the application of functions such as: offset correction, gain correction and defect correction to get better quality images. Correcting for defects may include correcting for defective image elements or pixels due to incorrectly manufactured image elements or corrupted pixel data. Correction may be applied by identifying pixels that do not work and the image data may be interpolated to correct for pixels that do not work. Another type of image processing may be video processing and video data packetization. Then the image data may be sent to a communications interface 122 and output using a communication protocol, such as ethernet and/or a fiber protocol (e.g., SPF+ (enhanced small form-factor pluggable) 124).

The virtual gate driver 112 allows an asymmetric split flat panel detector to be treated as a symmetric split detector from the point of view of image detector readout. This virtual gate driver 112 or dummy gate driver may be added so that the existing FPGA code, processing and/or functionality that was developed for a symmetric split detector readout may be reused without significant changes for the asymmetric case.

In another example, the drop rows module 118 may drop rows that are outside a region of interest (ROI) as defined in ROI settings. The ROI settings may be defined by a customer setting, an application setting or a user setting.

This use of a drop rows module 118 is not limited to applications in X-ray flat panel detectors. Any other types of image detectors, such as infrared (IR), may use the drop rows processing if there is a desire for the image detector to use special processing for the final image, (e.g. images where cropping or resizing is useful).

The number of partitions or regions in the flat panel detector may be evenly divisible by two. For example, the asymmetric split partition flat panel detector may have 2, 4, 6, 8 or more divisions in the asymmetric split partitions to provide improved flat panel detector readout. In such configurations, a virtual gate driver 112 may be provided for each split panel pairing. For example, if there are 4 partitions with 2 symmetric split panel pairs of partitions, then two virtual gate drivers may be provided.

This technology helps provide ease-of-use to the end user. The handling of the asymmetric split readout for the image sensors using an FPGA and the treating of an asymmetric split image sensor as a symmetric split image sensor may be hidden from the user's point of view. A user or customer may therefore define PAN or zoom modes as performed in the past for symmetrical spit detectors but the complexity of the asymmetric split in the gate driver hardware is invisible to the user or customer.

There is also a cost savings when using a virtual gate driver to read out from an asymmetric split panel image detector. It is possible to use a sixth hardware gate driver to maintain the symmetry of the split detectors and then not use half of the two center gate drivers for readout. However, the present technology avoids the need for additional hardware such as an additional gate driver to simplify readout of the image sensor. This means the overall cost of the sensor readout hardware is reduced (e.g., by 20%).

The ability to use the same main board (hardware design) to read out both the symmetric split image detector array and this asymmetric split image detector array provides further overall cost savings. This is because a separate firmware and hardware design does not need to be created for the processing pipelines of both the symmetric image detector array and the asymmetric split image detector array. This is a savings in engineering time and money.

The technology and platform illustrated in FIG. 1 provides a versatile image and data processing pipeline that may be used to instrument both symmetric and asymmetric split detectors made from (IGZO) indium gallium zinc oxide as well as other non-IGZO based detectors with minimal modifications. While the technology is described primarily in this disclosure as using flat panel detectors, the technology may also use curved, flexible or other geometries of detectors.

Figure 2A:
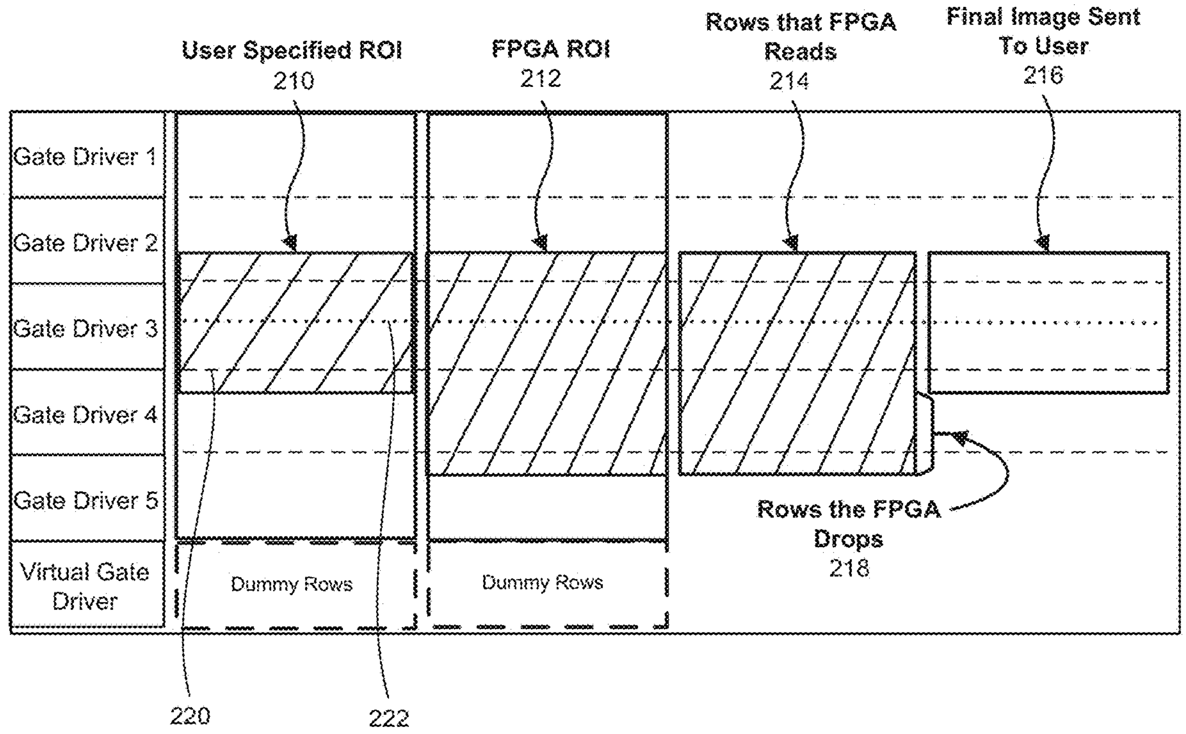
FIG. 2A is a diagram illustrating an example of the translation or conversion of a user specified region of interest (ROI) to a symmetric ROI (e.g., field programmable gate array (FPGA) ROI) and then to a final image.

FIG. 2A is a diagram illustrating an example of the translation or conversion of the user specified ROIs 210 to FPGA ROIs 212 and then to final image data 216. This example illustrates the process of the FPGA to first read out a ROI that is larger than the user specified ROI and then drop the unnecessary rows in the image processing pipeline before providing the final image as output for the user. Initially, a user may specify a desired ROI 210 which is a subset of rows from the asymmetric flat panel image detector. Because a symmetric readout may occur using the odd number of gate drivers and the virtual gate driver, the FPGA may receive a symmetric ROI (or FPGA ROI) around the physical partition 220 line. The symmetric ROI or FPGA ROI 212 may be defined as a ROI that includes symmetric readout (because symmetric readout is a basic function of the system to increase speed) containing the user's ROI but a portion of the FPGA ROI may contain dummy data and/or data outside of the user's ROI. The center line 222 of the image data has also been marked in this diagram. The symmetric readout may read from the outside rows on the top and bottom (two rows at a time) toward the center in parallel during symmetric processing.

Then the symmetric rows read by the FPGA 214 can have the unwanted rows dropped 218, which the customer does not want to see or use. These rows may be outside the user's ROI or the rows may be dummy data rows. The row dropping aspect of the process is hidden from the user, and the user is not aware of this additional processing for the ROI. The user may then receive the final image 216 without the dropped rows.

The ease of use with the ROI in the asymmetric system is of value for the end user. The user may see and program the image in way that is consistent with existing symmetric images where the split between the top and bottom partitions is in the center of the image data. This is useful because, often times when a customer wants to have a reduced field of view readout, the ROI is going to be centered in the geometric center of viewable image data coming from the readout. Since the center of the image data (e.g., the usable data) is different than the physical split in an asymmetric flat panel sensor, this technology may make that translation from asymmetric output to symmetric output without the user having to know about the translation. This way the image data appears in a format the user is used to and the physical representation of the asymmetric flat panel sensor is hidden to the user. For example, the user may want to have an ROI with 64 rows left and right from the geometric middle of the image data. This may be considered a center zoom ROI with a defined amount of data on each side of the center. This technology may translate the ROI from the center of the actual image or the geometric center of the image data to the window of data to be read out from the two partitions of the asymmetric flat panel sensor. This technology performs the work of conversion by having the gate drivers in the asymmetric split flat panel detector and virtual gate driver provide symmetric readout.

As discussed earlier, the ROI may be specified by the user, and the settings may be set through API (application programming interface) calls to the FPGA. The software may translate selected corner coordinates received from a user to the visible area to be output. Alternatively, a selected range of rows may be converted into the ROT. The ROI is generally not changed for a specific user imaging task, application and/or imaging system. However, the ROI may be set or modified with API calls. For example, for certain tasks or applications, a user wants the highest frame rate possible for the video output. So, the area of the ROI may be reduced in order to provide the highest frame rate output possible. Another task example may be to reduce the radiation delivery to a patient, so an exposure ROI may be reduced in order to only expose an area that is needed for medical treatment. Reducing the ROI size may also shrink the corresponding readout area for the asymmetric split flat panel image detector.

Figure 2B:
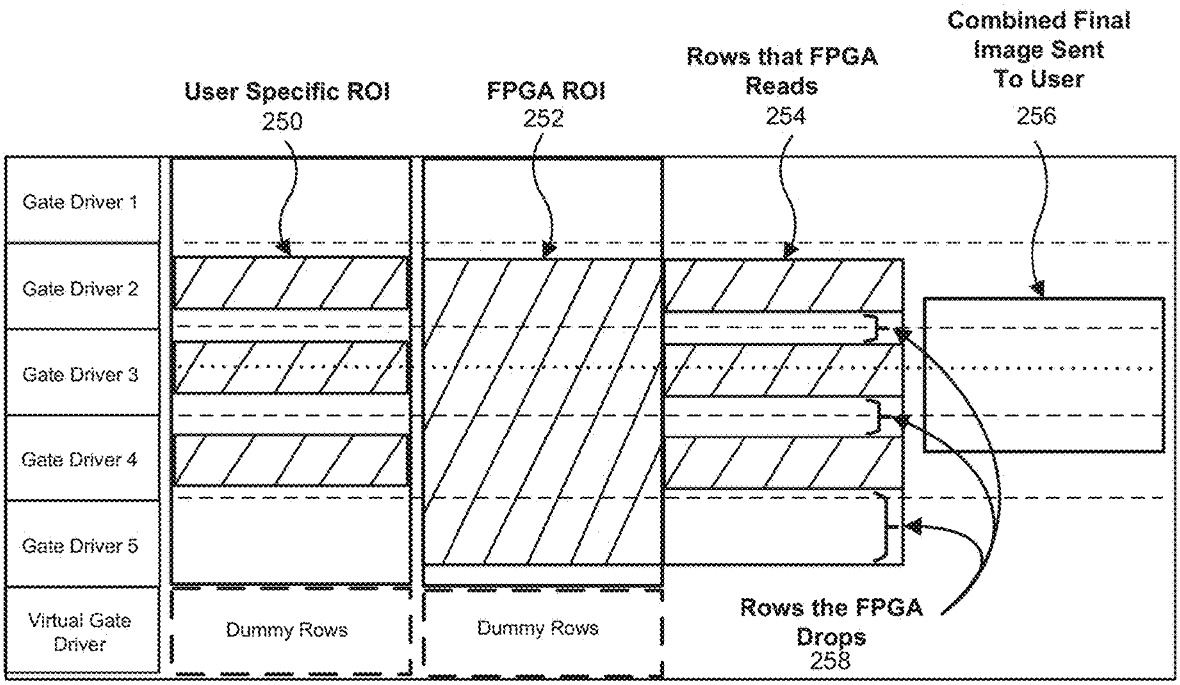
FIG. 2B is a diagram illustrating an example of multiple regions of interest (ROIs) in a symmetric readout using an odd number of gate drivers and a virtual gate driver.

FIG. 2B is a chart illustrating an example of multiple regions of interest (ROIs) in a symmetric readout using an asymmetric number of gate drivers and a virtual gate driver. The three regions of interest (ROIs) 250 illustrate that three ROIs may be desired by a user in a case where the X-ray detector is used to pan across a subject (e.g., panning across a person's teeth). While three regions are shown, any number of regions that fit within the image detectors area capacity may be set by the user. In this example, the symmetric image (e.g., FPGA ROI) 252 may be a readout that includes ROIs 254 from the panned area and areas outside the ROIs may be dropped 258. If the readouts of the ROIs include the dummy rows, then the dummy rows may also be dropped (not illustrated here). The ROIs may be joined together to make a final combined image 256 to be sent to the user. For example, the combined image may be segments of a person's teeth being scanned. The ROIs depicted horizontally in FIG. 2B may have been scanned vertically and may contain vertical segments of a person's teeth. In other terms, the head and chin of a person in the image may be oriented along the center axis. The image data may represent a strip that captures the teeth and that strip is a panoramic view around the head of the person.

In one example mode, ROIs obtained by panning around a subject may be at the top (gate driver 1) and bottom (gate driver 5) of the image. Then when the image is readout, the dummy rows would be read out also. In the mode previously shown in FIG. 2A, the ROI may be a center zoom mode, where the user is given the center line of the image and the user defines how many lines of the image data are on each side of the center line.

The user and/or the user's application may define what is to be in an image, and the user knows the physical geometry of their imaging setup. For example, the user may have a detector on one side and the x-ray tube on the other side (e.g., a panoramic dental x-ray). Accordingly, the user may rotate the detector around the object (e.g., a person's head) and may reconstruct a 3D volume of the head. As a result, the user may select the ROIs in such detection scenarios.

When there are multiple ROIs, the majority of the ROIs may be used as zoom modes. The ROIs may also be small strips that are 6 mm (millimeters) wide on up to half of the total image size. The ROIs are defined on an application basis and each application may have a desired field of view. If the application changes, the user may change the ROIs. The ROIs may limit the portions of the patient being imaged using the ROIs. To define an ROI, the user may input the coordinates of the ROI. In one example, the coordinates of a rectangular ROI may be defined using the upper left hand corner coordinate and the lower right hand corner coordinates. Alternatively, users like to select image rows around the center line of the image. In a further alternative, ROIs may also be defined using a start and stop row. The image coordinates may be identified using just the start row and stop row for the detector. Users may also define 2, 4 or more regions of interest. As mentioned, the ROIs may be merged into one image or field of view, and the area(s) the user might not want are dropped or scrubbed out.

Figure 3:
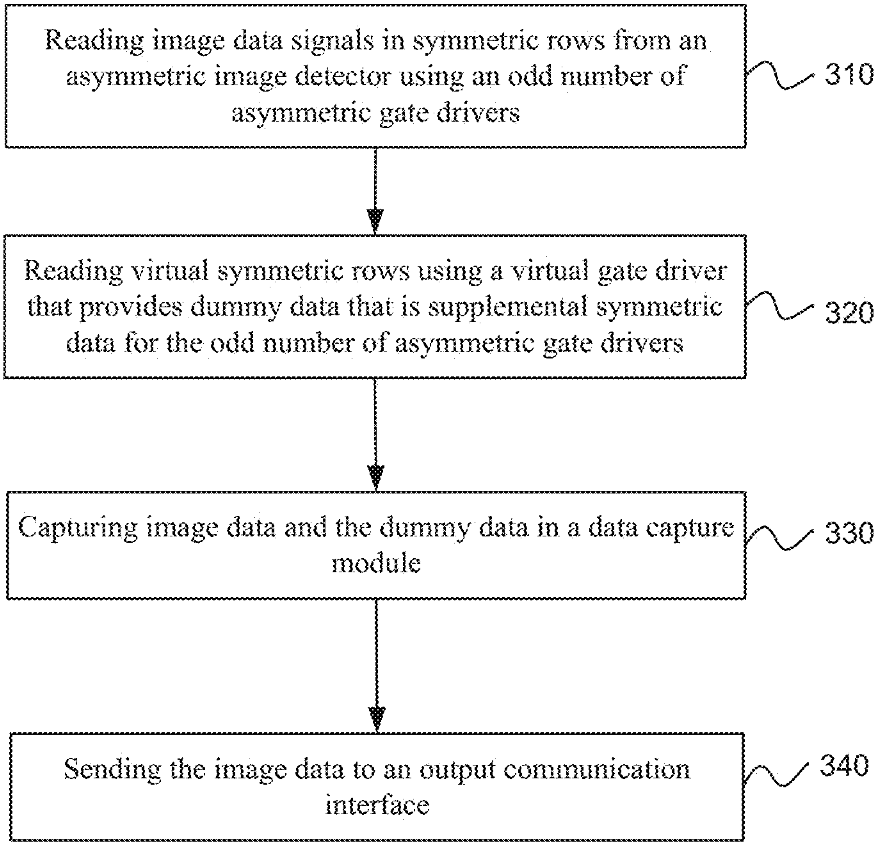
FIG. 3 is a flowchart illustrating an example of a method for providing symmetric image sensor readout from an asymmetric split detector.

FIG. 3 is a flowchart illustrating a method for providing symmetric image sensor readout from an asymmetric split detector. The method may include the operation of reading image data signals in symmetric rows from an asymmetric image detector using an odd number of gate drivers, as in block 310.

Virtual symmetric rows may be read using a virtual gate driver that provides dummy data that is supplemental symmetric data for the odd number of gate drivers, as in block 320. The use of the virtual gate driver (e.g., a dummy gate driver) provides symmetry for the readout. This virtual gate driver may exist in firmware (e.g., in the FPGA) but output dummy or filler signals for the image readout. For example, when a data row is readout from gate driver 1, then a symmetric data row may be readout from the virtual gate driver in parallel.

Image data and the dummy data may be captured in a data capture module, as in block 330. Another operation may be dropping the virtual symmetric rows that contain the dummy data using a drop rows module.

In one configuration, a region of interest (ROI) to be viewed from image data captured from the asymmetric image detector may be identified. For example, a user, customer, or application may define the ROI desired to be used in advance. Symmetric rows read out by the gate controller, due to the split readout nature of the image sensor, that are outside of an ROI may be dropped using a drop rows module. The image data may be sent to an output communication interface, as in block 340.

A symmetry line may be defined for gate drivers and the virtual gate driver. For example, the symmetry line may be defined by an odd number of gate drivers in a first partition and an even number of gate drivers and the virtual gate driver in a second partition. This symmetry line for the gate drivers (without the virtual gate driver) may be different than a symmetry line for the image data itself. The symmetry line for the image data may be the center rows of the image data. For example, the symmetry line of the image data may be where approximately half the image data rows are in one part of the image data and the other half of the image data rows are in the second part of the image data.

This technology overcomes the issue that the readout of an asymmetric split detector, which uses an odd number of gate drivers cannot achieve true symmetric readout by splitting one gate driver into two halves in an asymmetric readout scheme. Gate drivers do not support such functionality and thus asymmetric readout is performed for the asymmetric split detector. However, using the virtual gate driver enables symmetric readout of the asymmetric gate drivers in the split panel detector.

More details regarding the image detector will now be described. In one example, the asymmetric split panel image detector may be an IGZO type of detector that may detect X-rays. Gate drivers may be located on the opposite side of the detector along with the readout integrated circuits. There may also be different types of imaging panel arrangements. One type of imaging flat panel is an indirect conversion panel. An indirect conversion panel may use a scintillator to generate light and then sensors are used to covert the light to electrical signals. Indirect sensors may be made using amorphous silicon or CMOS (complementary metal-oxide semiconductor) types of fabrication, but IGZO may provide higher resolution at lower cost.

Another type of imaging flat panel is a direct conversion panel where X-rays hit the panel scintillator and are converted directly into an electrical potential. When an image is being generated, X-rays may hit the scintillator of the detector. Next, the X-rays are converted from X-ray photons to light photons. A two-dimensional array of photo diodes may be near the scintillator to collect the light signal and the light is converted to an electric signal and then into an image.

In order to address the two-dimensional (2D) arrays of photo diodes, gate drivers switch the photo diodes on row by row to enable the discrete photo elements and charge collected to be output. This results in a conversion from charge to voltage and finally to a digital signal. As described, the split architecture reads out two lines at a time. A readout scheme may be used where the array is simultaneously scanned two lines at a time from the outside edge to the center and this pattern reduces the readout time by a factor of two. This readout pattern provides performance advantages because parasitic capacitance and resistance are reduced. Shorter readout lines may result in lower parasitic effects. The gate driver chips may address a certain number of rows. The gate driver chips may be daisy chained and their addressing capacity has increased over the years to 512 lines. This means that if the number of rows in the image detector is not an even multiple of 512 then an even number of gate drivers is not possible.

Figure 4:
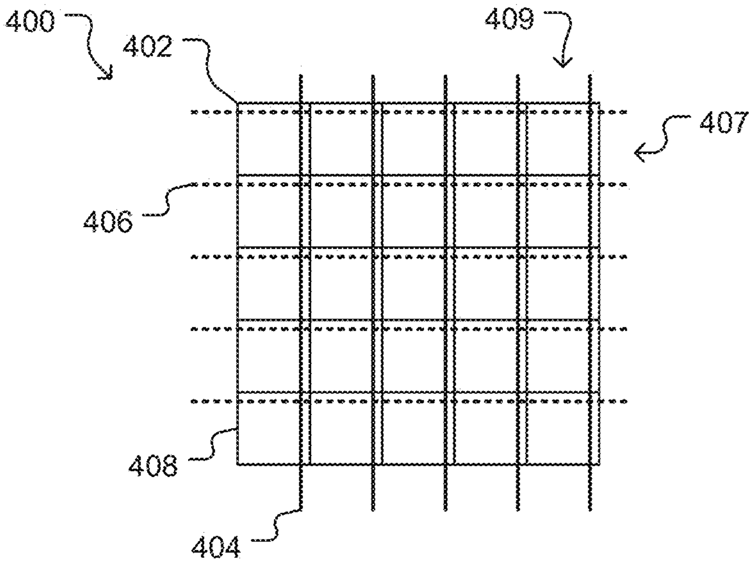
FIG. 4 is an example block diagram of an image detector.
Figure 5:
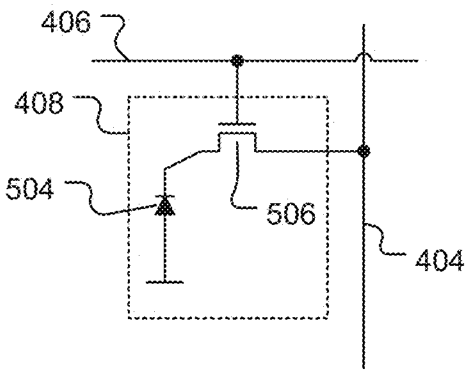
FIG. 5 is an example diagram of pixels of image detectors.

FIGS. 4 through 7 describe additional aspects of this technology relating to the underlying hardware architecture of the image detector. FIG. 4 is an example block diagram of a detector. FIG. 5 is an example diagram of a pixel of an image detector. Referring to FIGS. 4 and 5, in some configurations, a detector 400 includes an array 402. The array 402 may define a variety of pixels 408. The pixels 408 are disposed in rows 407 and columns 409.

The detector 400 may include multiple gate lines 406 associated with rows 407 of pixels 408 and multiple data lines 404 associated with columns 409. As will be described in further detail below, the data lines 404 may be configured to provide signals to sampling circuits (not illustrated here but see FIG. 1). These signals may include a desired signal from detected X-rays.

Pixel 408 is an example of a pixel 408 that is configured to generate a desired signal based on incident radiation, such as X-rays. The pixel 408 includes the sensor 504 electrically connected to a switch 506. The sensor 504 may include devices such as a photodiode, photodetector, a circuit including such devices, or the like. The sensor 504 is configured to convert X-rays, light, or other photons into an electrical signal, such as a charge or voltage. A scintillator, direct conversion material, or other X-ray conversion material may be part of the array 402 and configured to convert incident X-rays into photons that the sensor 504 may convert into an electrical signal. For example, a scintillator may include a variety of materials configured to convert X-ray photons into photons detectable by the sensors 504 such as cesium iodide (CsI), cadmium tungstate (CdWO4), polyvinyl toluene (PVT), gadolinium oxysulfide (Gd2O2S; GOS; Gadox), gadolinium oxysulfide doped with terbium (Gd2O2S:Tb), or the like. Examples of direct conversion materials include cadmium telluride (CdTe), cadmium zinc telluride (CdZnTe or CZT), mercury iodide (HgI), lead iodide (PbI), selenium, or the like.

The switch 506 may be a variety of devices including transistors such as transistors based on amorphous silicon (a-Si), complementary metal oxide semiconductors (CMOS), indium gallium zinc oxide (IGZO), or the like. The switch 506 may be electrically connected to a corresponding gate line 406 and a corresponding data line 404. The pixel 408 may include other components and electrical connections. A signal may be integrated and/or collected in the pixel 408. That signal may be read out through the switch 506 and a corresponding data line 404 in response to a signal on the corresponding gate line 406. For example, a charge may be integrated on the sensor 504. That charge may be read out through the switch and the data line 404.

Figure 6:
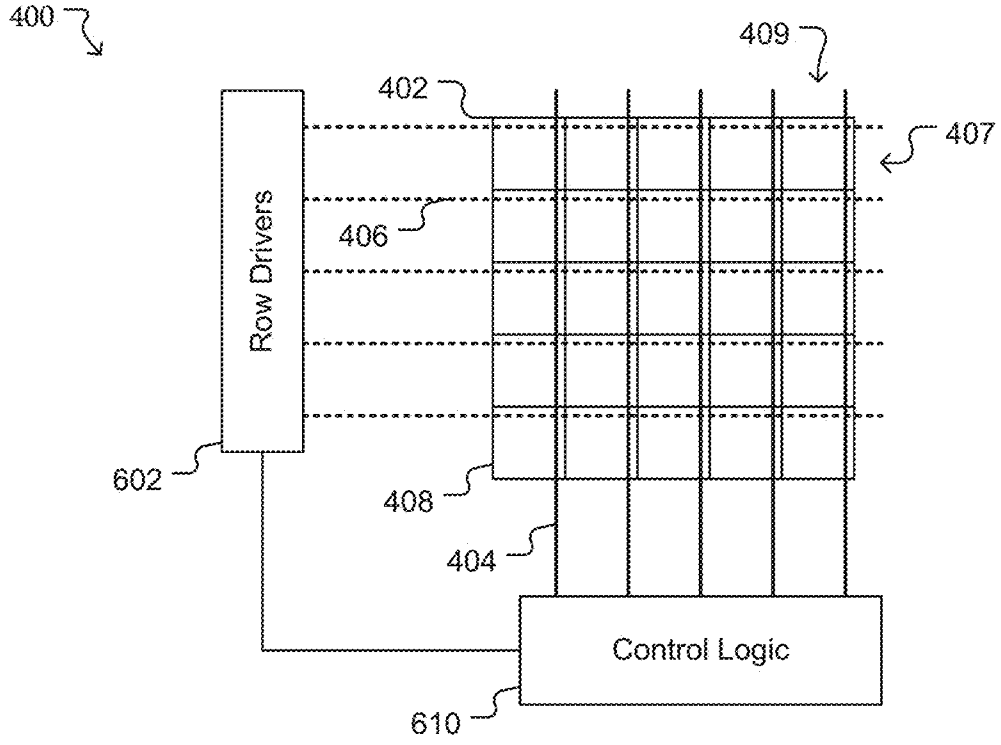
FIG. 6 is an example block diagram of an image detector with control logic.

FIG. 6 is an example block diagram of a detector. The detector 400 includes an array 402. The array 402 may be the arrays 402 described above in FIG. 4. The array 402 includes data lines 404 and row drivers 602. The row drivers 602 may be configured to generate signals on gate lines 406 to selectively activate rows 407 of the array 402.

The detector 400 includes control logic 610. The control logic 610 includes sampling circuits configured to sample signals from the pixels 408. The sampling circuits include circuits such as charge amplifiers, analog-to-digital converters (ADCs), sample-and-hold circuits, or the like configured to perform the sampling (See FIG. 1). The sampling circuits are coupled to the pixels 408 through data lines 404. The control logic 610 may include a general purpose processor, a digital signal processor (DSP), an application specific integrated circuit (ASIC), field programmable gate array (FPGA), a microcontroller, a programmable logic device (PLD), discrete circuits, a combination of such devices, or the like. The control logic 610 may include other circuits to couple the control logic 610 to the row driver 602, or the like to enable the control logic 610 to control the operation of such circuits.

Figure 7:
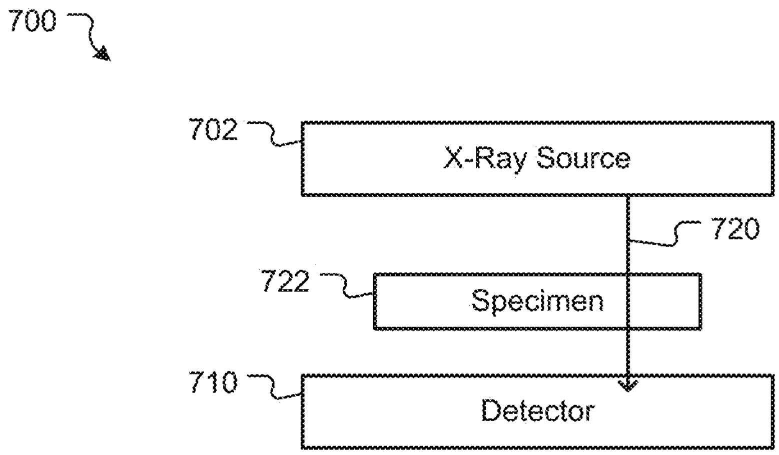
FIG. 7 is an example block diagram of a 2D X-ray imaging system.

FIG. 7 is a block diagram of a 2D X-ray imaging system according to some embodiments. The 2D X-ray imaging system 700 includes an X-ray source 702 and detector 710. The detector 710 may be similar to a detector 400 including an array 402 or the like as described above. The X-ray source 702 is disposed relative to the detector 710 such that X-rays 720 may be generated to pass through a specimen 722 and detected by the detector 710. In some embodiments, the detector 710 is part of a medical imaging system, dental imaging system, non-destructive testing system, or the like. In other embodiments, the 2D X-ray imaging system 700 may include a portable vehicle scanning system as part of a cargo scanning system.

The detector 710 may include a plurality of pixels 408, each pixel 408 may be configured to convert radiation into an electrical signal or light. A first set of a plurality of data lines 404 may be coupled to the pixels 408. Control logic 610 may be configured to receive signals through data lines 404. As described above, each pixel 408 may include a sensor 504 and a switch 506 or transistor electrically connected between the sensor 504 and the data line 404. In some embodiments, the pixels are disposed in rows 407 and columns 409 of an array 402.

Some embodiments may include a system comprising an odd number of gate drivers 104 to supply image data signals for an image detector 102 with asymmetrically split partitions of an array; a gate controller 110 to control image data signals from the odd number of gate drivers 104; a virtual gate driver 112, associated with the gate controller 110, to provide dummy data that is supplemental symmetric row data to be combined with image data signals from the odd number of gate drivers 104 of the image detector 102; and a data capture module 114 to capture symmetric image data including dummy data as received using the gate controller 110.

In some embodiments, the virtual gate driver 112 provides a symmetric pairing of dummy data for a gate driver 104 receiving signals from a partition of the image detector 102.

In some embodiments, a drop rows module 118 may drop rows from the symmetric image data read by the gate controller 110 to yield image data from the image detector 102.

In some embodiments, the system may drop virtual rows with dummy data using the drop rows module 118 to yield image data from the image detector 102. In further embodiments, dropping rows may occur for rows that are outside a region of interest (ROI) as defined in ROI settings. In some embodiments, the ROI settings may be defined by a customer setting, an application setting or a user.

In some embodiments, the image data signals which are read by the odd number of gate drivers 104 are from the image detector 102 with asymmetrically split partitions of the array and a number of partitions that are evenly divisible by two. In some embodiments, the image detector 102 is at least one of: an X-ray detector, an ultraviolet panel detector or an infrared panel detector.

In some embodiments, a symmetry line of the image detector 102 is defined by an odd number of gate drivers 104 in a first partition and an even number of gate drivers and the virtual gate driver 112 in a second partition.

Some embodiments include a method, comprising: reading image data signals in symmetric rows from an asymmetric image detector using an odd number of gate drivers 310; reading virtual symmetric rows using a virtual gate driver that provides dummy data that is supplemental symmetric data for the odd number of gate drivers 320; capturing image data and the dummy data in a data capture module 330; and sending the image data to an output communication interface 340.

In some embodiments, the virtual symmetric rows that contain the dummy data may be dropped using a drop rows module. In some embodiments, the virtual gate driver may be paired with one of the odd number of gate drivers to provide symmetric readout.

In some embodiments, a region of interest (ROI) to be viewed from image data captured from the asymmetric image detector may be identified. In some embodiments, symmetric rows from rows read by a gate controller that are outside of an ROI may be dropped using a drop rows module.

In some embodiments, the ROI is a setting defined by at least one of: a customer, an application or a user. In some embodiments, a symmetry line is defined for gate drivers and the virtual gate driver.

In some embodiments, a symmetry line may be defined by an odd number of gate drivers in a first partition and an even number of gate drivers and the virtual gate driver in a second partition.

Some embodiments include a system, comprising: means for reading image data signals in symmetric rows from an asymmetric image detector using an odd number of gate drivers; means for reading virtual symmetric rows using a virtual gate driver that provides dummy data that is supplemental symmetric data for the odd number of gate drivers; means for capturing image data and the dummy data in a data capture module; and means for sending the image data to an output communication interface.

Examples of the means for reading image data signals in symmetric rows from an asymmetric image detector using an odd number of gate drivers include the gate controller 110, data capture 114 or the like.

Examples of the means for reading virtual symmetric rows using a virtual gate driver that provides dummy data that is supplemental symmetric data for the odd number of gate drivers include the virtual gate driver 112, data capture 114 or the like.

Examples of means for capturing image data and the dummy data in a data capture module include the data capture 114 or the like.

Examples of means for sending the image data to an output communication interface include the drop rows module 118, image processing 120 and communication interface 112 or the like.

In some embodiments, a means may be provided for dropping virtual symmetric rows with dummy data using a drop rows module. In some further embodiments, a means may be provided for dropping symmetric rows that are outside a region of interest (ROI) as defined in ROI settings. Examples of means for dropping virtual symmetric rows with dummy data or symmetric rows may include the drop rows module 118, image processing 120 or the like.

Although the structures, devices, methods, and systems have been described in accordance with particular embodiments, one of ordinary skill in the art will readily recognize that many variations to the particular embodiments are possible, and any variations should therefore be considered to be within the scope disclosed herein. Accordingly, many modifications may be made by one of ordinary skill in the art without departing from the scope of the appended claims.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f).

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the scope of the described technology.

The invention claimed is:

1. A system, comprising:
- an odd number of gate drivers to supply image data signals for an image detector with asymmetrically split partitions of an array;
- a gate controller to control image data signals from the odd number of gate drivers;
- a virtual gate driver, associated with the gate controller, to provide dummy data that is supplemental symmetric row data to be combined with image data signals from the odd number of gate drivers of image detector; and
- a data capture module to capture symmetric image data including dummy data as received using the gate controller.

2. The system as in claim 1, wherein the virtual gate driver provides a symmetric pairing of dummy data for a gate driver receiving signals from a partition of the image detector.

3. The system as in claim 1, further comprising a drop rows module to drop rows from the symmetric image data read by the gate controller to yield image data from the image detector.

4. The system as in claim 3, further comprising dropping virtual rows with dummy data using the drop rows module to yield image data from the image detector.

5. The system as in claim 3, further comprising dropping rows that are outside a region of interest (ROI) as defined in ROI settings.

6. The system as in claim 5, wherein the ROI settings are defined by a customer setting, an application setting or a user.

7. The system as in claim 1, wherein the image data signals which are read by the odd number of gate drivers are from the image detector with asymmetrically split partitions of the array and a number of partitions that are evenly divisible by two.

8. The system as in claim 7, wherein the image detector is at least one of: an X-ray detector, an ultraviolet panel detector or an infrared panel detector.

9. The system as in claim 1, wherein a symmetry line of the image detector is defined by an odd number of gate drivers in a first partition and an even number of gate drivers and the virtual gate driver in a second partition.

10. A method, comprising:
- reading image data signals in symmetric rows from an asymmetric image detector using an odd number of gate drivers;
- reading virtual symmetric rows using a virtual gate driver that provides dummy data that is supplemental symmetric data for the odd number of gate drivers;
- capturing image data and the dummy data in a data capture module; and
- sending the image data to an output communication interface.

11. The method as in claim 10, further comprising dropping the virtual symmetric rows that contain the dummy data using a drop rows module.

12. The method as in claim 10, further comprising pairing the virtual gate driver with one of the odd number of gate drivers to provide symmetric readout.

13. The method as in claim 11, further comprising identifying a region of interest (ROI) to be viewed from image data captured from the asymmetric image detector.

14. The method as in claim 13 further comprising dropping symmetric rows from rows read by a gate controller that are outside of an ROI using a drop rows module.

15. The method as in claim 13, wherein the ROI is a setting defined by at least one of: a customer, an application or a user.

16. The method as in claim 11, wherein a symmetry line is defined for gate drivers and the virtual gate driver.

17. The method as claim 11, further comprising defining a symmetry line by an odd number of gate drivers in a first partition and an even number of gate drivers and the virtual gate driver in a second partition.

18. A system, comprising:

a gate controller for reading image data in symmetric rows from an asymmetric image detector using an odd number of gate drivers;

a virtual gate driver for reading virtual symmetric rows using a virtual gate driver that provides dummy data that is supplemental symmetric data for the odd number of gate drivers;

a data capture for capturing the image data and the dummy data in a data capture module; and a communication interface for sending the image data to an output communication interface.

19. The system as in claim 18, further comprising a drop rows module for dropping virtual symmetric rows with dummy data.

20. The system as in claim 18, further comprising a drop rows module for dropping symmetric rows that are outside a region of interest (ROI) as defined in ROI settings.

* * * * *